US009820204B2

United States Patent
Greenwalt, III

(10) Patent No.: US 9,820,204 B2
(45) Date of Patent: *Nov. 14, 2017

(54) REDUCING STREAM INTERRUPTIONS DURING NETWORK HANDOVER

(71) Applicant: Google Inc., Mountain View, CA (US)

(72) Inventor: Robert J. Greenwalt, III, Woodside, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/210,081

(22) Filed: Jul. 14, 2016

(65) Prior Publication Data

US 2016/0323797 A1 Nov. 3, 2016

Related U.S. Application Data

(63) Continuation of application No. 14/037,187, filed on Sep. 25, 2013, now Pat. No. 9,398,505.
(Continued)

(51) Int. Cl.
*H04W 36/18* (2009.01)
*H04L 29/06* (2006.01)
(Continued)

(52) U.S. Cl.
CPC ......... *H04W 36/18* (2013.01); *H04L 65/4069* (2013.01); *H04W 36/14* (2013.01);
(Continued)

(58) Field of Classification Search
CPC . H04W 36/18; H04W 36/14; H04W 65/4069; H04W 84/12
See application file for complete search history.

(56) References Cited

U.S. PATENT DOCUMENTS 6,674,746 B1 1/2004 Lamarque
6,725,044 B2 4/2004 Verma et al.
(Continued)

FOREIGN PATENT DOCUMENTS

WO 2001076276 10/2001
WO 2005119978 12/2005

OTHER PUBLICATIONS

'Android and Me' [online]. "First Android devices with WiFi Display will be powered by Qualcomm's Snapdragon," 2012, [retrieved on 2012. Retrieved from the Internet: URL:<http://androidandme.com/2012/01 /news/first-android-devices-with-wi-fi-display-will-be-powered-by-qualcomms-snapdragon/#comments> 13 pages.
(Continued)

*Primary Examiner* — Rasheed Gidado
(74) *Attorney, Agent, or Firm* — Fish & Richardson P.C.

(57) ABSTRACT

Methods, systems, and apparatus, including computer programs encoded on a computer storage medium, for receiving streaming media while switching between different networks is described. In one aspect, a method includes receiving a portion of a streaming media through a data connection on a first communication channel between a mobile device and a first network, and while the portion of the streaming media is being received through the data connection on the first communication channel, detecting that a second communication channel between the mobile device and a second network is available, establishing a data connection on the second communication channel, and receiving data through the second data connection on the second communication channel.

20 Claims, 3 Drawing Sheets

Related U.S. Application Data

(60) Provisional application No. 61/784,195, filed on Mar. 14, 2013.

(51) Int. Cl.
*H04W 36/14* (2009.01)
*H04W 36/00* (2009.01)
*H04W 80/06* (2009.01)
*H04W 84/04* (2009.01)
*H04W 84/12* (2009.01)

(52) U.S. Cl.
CPC ........ *H04W 36/0011* (2013.01); *H04W 80/06* (2013.01); *H04W 84/042* (2013.01); *H04W 84/12* (2013.01)

(56) References Cited

U.S. PATENT DOCUMENTS

| | | | |
|---|---|---|---|
| 6,738,373 | B2 | 5/2004 | Turner |
| 6,850,740 | B1 | 2/2005 | Haartsen |
| 6,987,743 | B2 | 1/2006 | Chen et al. |
| 7,136,645 | B2 | 11/2006 | Hanson et al. |
| 7,170,871 | B2 | 1/2007 | Eyuboglu et al. |
| 7,353,027 | B2 | 4/2008 | Karagiannis et al. |
| 7,426,178 | B2 | 9/2008 | Guo et al. |
| 8,000,708 | B1 | 8/2011 | Woleben |
| 8,005,988 | B2 | 8/2011 | Maes |
| 8,037,188 | B2* | 10/2011 | Li .................... H04L 12/66 370/331 |
| 8,078,164 | B2 | 12/2011 | Ganesan |
| 8,458,353 | B2 | 6/2013 | Krishnaswamy |
| 8,606,954 | B1 | 12/2013 | Abidogun et al. |
| 2004/0082337 | A1* | 4/2004 | Lacroix .............. H04L 1/1607 455/450 |
| 2005/0271014 | A1 | 12/2005 | Gillies et al. |
| 2006/0153124 | A1 | 7/2006 | Kant et al. |
| 2006/0199586 | A1 | 9/2006 | Yoon |
| 2007/0135102 | A1 | 6/2007 | Kister et al. |
| 2007/0265003 | A1 | 11/2007 | Kezys et al. |
| 2008/0146230 | A1 | 6/2008 | Pandian et al. |
| 2008/0259871 | A1 | 10/2008 | Baek et al. |
| 2008/0285518 | A1 | 11/2008 | Dutta et al. |
| 2009/0116435 | A1 | 5/2009 | Koorapaty et al. |
| 2009/0124284 | A1 | 5/2009 | Scherzer et al. |
| 2009/0191878 | A1 | 7/2009 | Hedqvist et al. |
| 2010/0150110 | A1 | 6/2010 | Dutta et al. |
| 2010/0260146 | A1 | 10/2010 | Lu |
| 2010/0272049 | A1 | 10/2010 | Tung et al. |
| 2010/0304711 | A1* | 12/2010 | Pugliese ............ H04L 12/14 455/406 |
| 2011/0182270 | A1 | 7/2011 | Shaheen et al. |
| 2012/0108277 | A1 | 5/2012 | Chan et al. |
| 2012/0127955 | A1 | 5/2012 | Gandham et al. |
| 2012/0163344 | A1 | 6/2012 | Bakthavathsalu et al. |
| 2013/0022030 | A1 | 1/2013 | Hillier |
| 2013/0029639 | A1 | 1/2013 | Lee et al. |
| 2013/0039343 | A1 | 2/2013 | Hori et al. |
| 2013/0155976 | A1* | 6/2013 | Chen .................. H04W 72/0453 370/329 |
| 2013/0229976 | A1 | 9/2013 | Srinivasan et al. |
| 2013/0230023 | A1 | 9/2013 | Gray et al. |
| 2014/0189160 | A1 | 7/2014 | Haddad et al. |
| 2014/0269615 | A1 | 9/2014 | Greenwalt, III |

OTHER PUBLICATIONS

'Android Authority' [online] "WiFi Display to Make Your Life Easier in 2012," 2012, [retrieved on Oct. 27, 2012]. Retrieved from the Internet: URL:<www.androidauthority.com/wifi-display-to-make-your-life-easier-in-2012-47153/> 7 pages.

'Intel® Wireless Networking' [online]. "Intel® Wireless Display, Issue using Intel® Wireless Display with WiMAX," 2011, [retrieved on Oct. 29, 2012]. Retrieved from the Internet: URL:<www.intel.com/support/wireless/wtech/iwd/sb/CS-031661.htm> 1 page.

"3G/Wi-Fi Seamless Offload," Qualcomm, Incorporated, Mar. 2010, 11 pages.

"Cisco Mobile VPN-Enabling Cisco End-Device Based IP Mobility," last updated Feb. 2006, 19 pages.

"Mobile data offloading," from Wikipedia, the free encyclopedia last modified Jul. 16, 2013, downloaded from the internet on Jul. 23, 2013 at www.wikipedia.org.wiki.Mobile_data_offloading, 4 pages.

Alkhawlani, Mohammed M. "Multi-Criteria Vertical Handover for Heterogonous Networks," International Journal of Wireless & Mobile Networks (IJWMN), vol. 3, No. 2, Apr. 2011, 15 pages.

Chen, Beizhong et al., "Fast Handover for Multiple-Interface Mobile Devices Connecting to a Single Foreign Agent in MIPv4 with MIH Support," IEEE ICC 2009, 5 pages.

Ekiz, Nauf et al., "An Overview of Handoff Techniques in Cellular Networks," International Journal of Information and Communication Engineering, Feb. 6, 2006, 5 pages.

Ford, A., et al., "Architectural Guidelines for Multipath TCP Development," Internet Engineering Task Force (IETF) Mar. 2011, 58 pages.

Handa, Arun, "Mobile Data Offload for 3G Networks," A Whitepaper, IntelliNet Technologies, Oct. 2009, 7 pages.

Nguyen, Thinh P.Q., "Path Diversity Media Streaming over Best Effort Packet Networks," a dissertation submitted in partial satisfaction of the requirements for the degree of Doctor of Philosophy in Engineering—Electrical Engineering and Computer Sciences in the Graduate Division of the University of California at Berkeley, 2000, 185 pages.

Paasch, Christoph et al., "Exploring Mobile/WiFi Handover and Multipath TCP," CellNet '12, Aug. 13, 2013, Helsinki, Finland, 6 pages.

Pan, Yi et al., "An End-to-End Multi-Path Smooth Handoff Scheme for Stream Media," WMASH '03, Sep. 19, 2003, 12 pages.

ParandehGheibi, Ali et al., "Access-Network Association Policies for Media Streaming in Heterogeneous Environments," submitted to CDC Apr. 20, 2010, 8 pages.

Tüysüz, Ayş egül et al., "Handovers in Wireless Overlay Networks Based on Mobile IPV6," Conference on Academic Information '05 (Akademik Biliş im 2005), Gaziantep, Turkey, 2005, 10 pages.

Venkataraman, Narendra, "Inside Mobile IP," Dr. Dobb's The World of Software Development, Sep. 1, 2005, 7 pages.

Ward, Torbjorn, Reality Check: Seamless Wi-Fi off-load—A business opportunity for mobile operators, Jun. 23, 2010, www.rcrwireless.com/article/20130625/opinion/reality-check-seamless-wi-fi-off-load-a-business-opportunity-mobile-operators/, 5 pages.

* cited by examiner

REDUCING STREAM INTERRUPTIONS DURING NETWORK HANDOVER

CROSS REFERENCE TO RELATED APPLICATION

This application is a continuation of U.S. application Ser. No. 14/037,187, filed Sep. 25, 2013, which claims the benefit of the priority of U.S. Provisional Application Ser. No. 61/784,195, filed Mar. 14, 2013, both of which are incorporated herein by reference in their entirety.

BACKGROUND

This specification relates to receiving streaming media while switching between different networks.

Communication networks allow a user of a mobile device to access information. Networks may be arranged in a structure that includes different layers of networks. The networks in the different layers differ from each other with respect to network technologies. The higher layers include network technologies that cover a large area but have low bandwidth, while the lower layers include network technologies that have high bandwidth but cover a small area.

Networks in the different layers may overlap each other such that more than one network may be available at a given location. A mobile device may be equipped with multiple interfaces for connecting with different networks. A mobile device that includes multiple interfaces may require the ability to switch between the interfaces during the course of a data transfer session when more than one network is available at a given location. A switch between different interfaces to connect with different networks is known as a vertical handover.

For example, a location may be within a wireless wide area network (WWAN), such as a satellite network or cellular network, and a wireless local area network (WLAN), such as a Wi-Fi network. A mobile device that includes multiple wireless interfaces may need to switch between the wireless interfaces to connect with the different wireless networks. Similarly, a location may be within a wireless network, such as a cellular network or a Wi-Fi network, and near a wireline port, such as an Ethernet port, for connecting with a wireline network. A mobile device that includes a wireless interface and a wireline interface may need to switch between the wireless interface to connect with the wireless network and the wireline interface to connect with the wireline network.

SUMMARY

A mobile device may include multiple communication interfaces for switching between different networks. When a mobile device switches from an old network to a new network, the mobile device may need to establish a connection to the new network and redirect any ongoing data transfers from the old network to the new network. During the switch from the old network to the new network, some data may be delayed or lost. The delayed or lost data may cause an interruption in the presentation of the data to a user of the mobile device. This interruption may be significant and undesirable to a user being presented with streaming media.

In general, one innovative aspect of the subject matter described in this specification may be implemented in methods for receiving streaming media while switching between different networks. The mobile device may be connected to a first network and may be receiving streaming media through a data connection on a first communication channel between the mobile device and the first network. While the streaming media is being received through the data connection on the first communication channel, the mobile device may detect that a second communication channel between the mobile device and a second network is available. Even though a second communication channel on a second network is available, the mobile device may maintain the data connection on the first communication channel and may continue to receive the streaming media through the data connection on the first communication channel. When a user of the mobile device requests other data, the mobile device may establish a data connection on the second communication channel for fulfilling the user's request for other data. While and after the other data is received through the data connection on the second communication channel, the mobile device may maintain the data connection on the first communication channel and continue to receive the streaming media through the data connection on the first communication channel until all data of the streaming media has been received or a time period has elapsed. If the time period has elapsed and data of the streaming media still remains to be received, the mobile device may establish another data connection on the second communication channel and redirect the streaming of the media from the data connection on the first communication channel to the other data connection on the second communication channel.

In further detail, the methods for receiving streaming media while switching between different networks include receiving a portion of a streaming media through a data connection on a first communication channel between a mobile device and a first network; and while the portion of the streaming media is being received through the data connection on the first communication channel: detecting that a second communication channel between the mobile device and a second network is available, establishing a data connection on the second communication channel, and receiving data through the second data connection on the second communication channel.

These and other implementations may each optionally include one or more of the following features. In various examples, the first network includes a wireless wide area network, and the second network includes a wireless local area network. The first communication channel includes a cellular communication channel, and the second communication channel includes a Wi-Fi communication channel. The first network includes a wireless network, and the second network includes a wireline network. The first communication channel includes one of a cellular channel or a Wi-Fi channel, and the second communication channel includes an Ethernet channel. A data connection includes a TCP connection. The method further includes while the second communication channel between the mobile device and the second network is available: maintaining the data connection on the first communication channel until all of the streaming media has been received; closing the data connection on the first communication channel after all of the streaming media has been received; and reducing power provided to a communication interface of the mobile device that maintained the data connection on the first communication channel. The method further includes while the second communication channel between the mobile device and the second network is available: maintaining the data connection on the first communication channel for a time period while the portion of the streaming media is being received; closing the data connection on the first communication channel after the time period has elapsed; and reducing power provided to a communication interface of the mobile device that maintained the data connection on the first communication channel. The time period is based on at least one of a transfer data rate of the streaming media that is being received through the data connection on the first communication channel, a number of bits of data that has been received between the mobile device and the first network over a monitored time period, a data type of the streaming media, or an input from a user of the mobile device. The method further includes establishing another data connection on the second communication channel, and receiving a remaining portion of the streaming media through the other data connection on the second communication channel.

Particular implementations of the subject matter described in this specification may be implemented to realize one or more of the following advantages. The mobile device may maintain a data connection on a communication channel between the mobile device and the old network to support any ongoing data transfers over the data connection rather than immediately redirecting the ongoing data transfers to the second network. Maintaining the data connection on the communication channel between the mobile device and the old network to support any ongoing data transfers may reduce the delay in transferring data and may reduce data loss. The interruptions in the presentation of the data to a user of the mobile device may be reduced, thus enhancing the user's overall experience with the mobile device.

The details of one or more implementations of the subject matter described in this specification are set forth in the accompanying drawings and the description below. Other potential features, aspects, and advantages of the subject matter will become apparent from the description, the drawings, and the claims.

DETAILED DESCRIPTION

Figure 1:
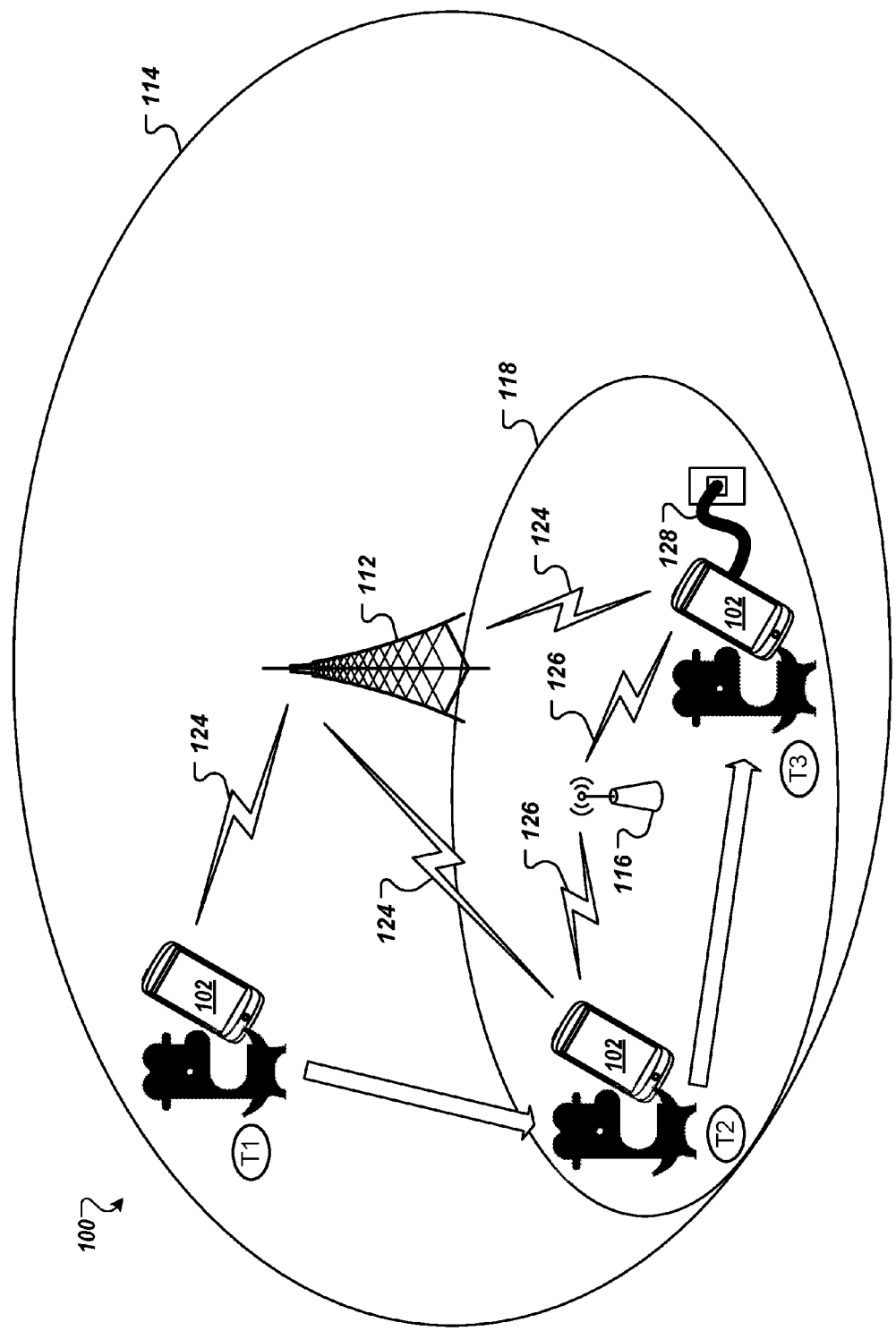
FIG. 1 is a conceptual diagram of exemplary frameworks for streaming media while switching between different networks.

FIG. 1 is a conceptual diagram of an exemplary framework 100 for receiving streaming media while switching between different networks. In particular, the framework 100 includes a mobile device 102. The mobile device 102 may include, for example, handheld computers, tablet computers, personal digital assistants (PDAs), cellular telephones, smart phones, enhanced general packet radio service (EGPRS) mobile phones, media players, e-book readers, or a combination of any two or more of these data processing devices or other data processing devices.

The mobile device 102 can communicate with one or more wireline and/or wireless networks through one or more wireline or wireless communication channels. A communication channel, or channel, may refer to a physical transmission medium such as a wire, or to a logical connection over a multiplexed medium such as a radio channel. A channel may be used to transfer data, such as a digital bit stream, from a sender to a receiver. A channel may have a certain capacity for transmitting data, typically measured by its bandwidth or its data rate.

Each communication channel may support one or more data connections. A data connection is a communication session or a semi-permanent connection that is established for transferring data. A data connection may be established using a connection-oriented communication protocol, such as Asynchronous Transfer Mode (ATM), connection-oriented Ethernet, Datagram Congestion Control Protocol (DCCP), Frame Relay, General Packet Radio Service (GPRS), Stream Control Transmission Protocol (SCTP), and Transmission Control Protocol (TCP).

In FIG. 1, the mobile device 102 can communicate with a cellular network through a cellular channel 124 between the mobile device 102 and a cellular tower transceiver 112. The cellular tower transceiver 112 can provide wireless communication over a wide area 114. Similarly, the mobile device 102 can communicate with a local area network through a Wi-Fi channel 126 between the mobile device 102 and an access point transceiver 116, such as an 802.11g wireless access device. The access point transceiver 116 can provide wireless communication over a local area 118. The mobile device 102 can communicate over an Ethernet channel 128 using an Ethernet cable connecting the mobile device 102 to an Ethernet port. The Ethernet channel 128 can provide the mobile device 102 with access to a wireline network. The mobile device 102 may be able to communicate with other networks using different network technologies than those described above.

FIG. 1 shows examples of a user's locations at times T1 to T3 while the mobile device 102 is receiving data over connections established on communication channels of different networks. The data may include streaming media. Streaming media includes data that is constantly received by the mobile device 102 and presented to the user while being delivered to the mobile device 102 by a provider of the streaming media. The mobile device 102 can present the streaming media to the user before the entire streaming media file has been transmitted. The terms "streaming" and "to stream" refer to the process of delivering the streaming media in the manner described. Streaming media may include audio, video, images, text, or a combination, such as Internet television, Internet radio, streaming movies, streaming music, live video and audio streams, video conferencing, live closed captioning, stock tickers, and real-time text.

In an example scenario, the user is located within the communication range 114 of the cellular tower transceiver 112 at time T1. The mobile device 102 is in communication with the cellular tower transceiver 112 through a cellular channel 124. The mobile device 102 is receiving streaming media, e.g., a live football game broadcast over the Internet, over a data connection established on the cellular channel 124 between the mobile device 102 and the cellular tower transceiver 112. The mobile device 102 is presenting the football game to the user as the data of the football game is being received.

While the mobile device 102 is streaming the football game over the cellular channel 124, the user moves to a location within the communication range 114 of the cellular tower transceiver 112 and the communication range 118 of the access point transceiver 116 at time T2. The mobile device 102 detects that a Wi-Fi channel 126 between the mobile device 102 and the access point transceiver 116 is available.

As the user moves to the location within the communication range 118 of the access point transceiver 116, the mobile device 102 maintains the connection on the cellular channel 124 with the cellular tower transceiver 112 and continues to stream the football game over the connection on the cellular channel 124. While still streaming the football game on the mobile device 102 over the connection on the cellular channel 124, the user accesses a web page to check the scores for other football games. The mobile device 102 establishes a connection over the Wi-Fi channel 126 for fulfilling the user's request to access the web page. The mobile device 102 receives the data of the web page over the connection on Wi-Fi channel 126, while continuing to stream the football game over the connection on cellular channel 124.

The user continues to move until the user reaches a location near an Ethernet port at time T3. The mobile device 102 is still within the communication range 114 of the cellular tower transceiver 112 and the communication range 118 of the access point transceiver 116. The user connects the mobile device 102 to the Ethernet port using an Ethernet cable. The mobile device 102 detects that an Ethernet channel 128 is available.

As the user is connecting the mobile device 102 to the Ethernet port, the mobile device 102 continues to stream the football game over the connection on the cellular channel 124 and receives an update of the scores displayed on the web page over the connection on the Wi-Fi channel 126. To continue to stream the football game without interruption, the mobile device 102 maintains the connection on the cellular channel 124. To receive the update of the scores without further delay, the mobile device maintains the connection on the Wi-Fi channel 126. After receiving the update of the scores, the mobile device closes the connection on the Wi-Fi channel 126 and establishes a connection on the Ethernet channel 128 for receiving future updates of the scores displayed on the web page. The mobile device 102 redirects the data of the web page to the connection on the Ethernet channel 128. No other connections are open on the Wi-Fi channel 126, so the mobile device 102 reduces power to a Wi-Fi transceiver in the mobile device 102.

The mobile device 102 continues to stream the football game over the connection on the cellular channel 124 for some amount of time while also connected to the Ethernet port to receive updates to scores over the connection on the Ethernet channel 128. The mobile device 102 then establishes a second connection on the Ethernet channel 128 for streaming the football game. The mobile device 102 redirects the data of the football game to the second connection on the Ethernet channel 128. Once the mobile device 102 begins receiving the data of the football game over the second connection on the Ethernet channel 128, the mobile device 102 closes the connection on the cellular channel 124. No other data connections are open on the cellular channel 124, so the mobile device 102 reduces power to the cellular transceiver in the mobile device 102.

In the above example scenario, the redirection of an ongoing data transfer from one network to another network is delayed until all of the data is received or a certain time period has elapsed. In contrast to immediately redirecting the ongoing data transfer, delaying the redirection of the ongoing data transfer may reduce interruptions in the presentation of the data to a user of the mobile device, and thus may enhance the user's overall experience with the mobile device.

Figure 2:
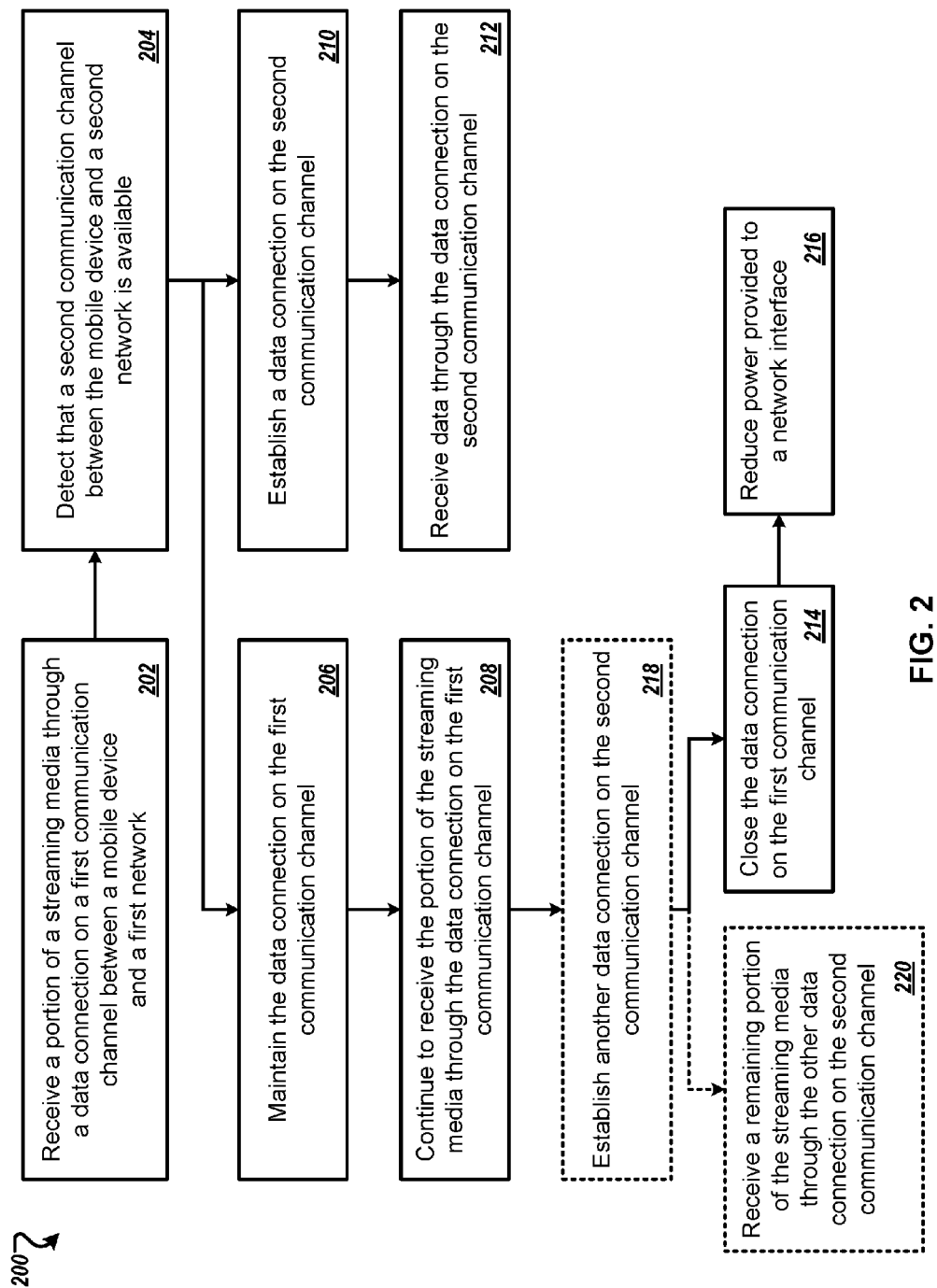
FIG. 2 is a flowchart of an example process for streaming media while switching between different networks.

FIG. 2 is a flowchart of an example process 200 for receiving streaming media while switching between different networks. The process 200 can be performed by a mobile device, e.g., the mobile device 102 of FIG. 1. Briefly, the process 200 includes receiving a portion of a streaming media through a data connection on a first communication channel between a mobile device and a first network, detecting that a second communication channel between the mobile device and a second network is available, maintaining the data connection on the first communication channel, establishing a data connection on the second communication channel, receiving data through the data connection on the second communication channel, continue receiving the portion of the streaming media through the data connection on the first communication channel, optionally establishing another data connection on the second communication channel, closing the data connection on the first communication channel, and optionally receiving a remaining portion of the streaming media over the other data connection on the second communication channel.

In more detail, the process 200 begins as the mobile device is receiving a portion of a streaming media through a data connection on a first communication channel between the mobile device and a first network (202). The first network may include a wireless wide area network, such as a satellite network or a cellular network, or a wireless local area network, such as Wi-Fi. The first communication channel may be, for example, a satellite channel, a cellular channel, or a Wi-Fi channel. The data connection may include a TCP connection.

While the mobile device is receiving the portion of the streaming media through the data connection on the first communication channel, the mobile device detects that a second communication channel between the mobile device and a second network is available (204). The second network may be a network in a communication network layer lower than the first network. For example, when the first network includes a wireless wide area network, the second network may include a wireless local area network such as a Wi-Fi network or a wireline network such as an Ethernet network, and the second communication channel may include a Wi-Fi channel or an Ethernet channel. When the first network includes a wireless local area network such as a Wi-Fi network, the second network may include a wireline network such as an Ethernet network, and the second communication channel may include an Ethernet channel.

Although the second communication channel may be available, the mobile device may maintain the data connection on the first communication channel (206) and may continue to receive the portion of the streaming media through the data connection on the first communication channel (208). The mobile device may determine to maintain the data connection on the first communication channel to continue to receive the streaming media through the data connection on the first communication channel in response to detecting that the second communication channel is available. In determining to maintain the data connection on the first communication channel, the mobile device may determine that the type of data that is being received through the data connection is streaming media. Maintaining the data connection on the first communication channel may reduce interruptions to the presentation of the streaming media to a user of the mobile device. If the type of data that is being received through the data connection is not streaming media, the mobile device may immediately redirect the data that is being received to the second communication channel.

While receiving the portion of the streaming media through the data connection on the first communication channel, the mobile device may establish a data connection on the second communication channel (210). The data connection may include a TCP connection. The mobile device may establish the data connection on the second communication channel in response to, for example, a new request from the user for data. The mobile device receives the data through the data connection on the second communication channel (212). For example, while the mobile device is streaming and displaying media to the user, the user may access a web page. In response to the user accessing the web page, the mobile device establishes the data connection on the second communication channel and receives the data associated with the web page through the data connection on the second communication channel.

The mobile device may maintain the data connection on the first communication channel until all of the streaming media has been received. After all of the streaming media has been received, the mobile device may close the data connection on the first communication channel (214). If no other data connections are open on the first communication channel, the mobile device may reduce power provided to a communication interface of the mobile device that maintained the data connection on the first communication channel (216).

The mobile device may maintain the data connection on the first communication channel until a time period has elapsed. The time period may be based on a transfer data rate of the streaming media that is being transferred over the data connection on the first communication channel. For example, the time period may be longer for a high data rate, which may indicate that the mobile device is receiving a streaming video. The time period may be shorter for a low data rate, which may indicate that the mobile device is receiving streaming text. Thus, if the mobile device is presenting a streaming video to the user, the streaming video may be presented to the user for a longer period of time before the streaming video is redirected to another network, which may reduce interruptions to the presentation of the streaming video.

The time period for maintaining the connection may be based on the number of bits of data that has been transferred between the mobile device and the first network over a monitored time period. The time period may be longer if the number of bits that has been transferred is low over the monitored time period. The time period may be shorter if the number of bits that has been transferred is high over the monitored time period. For example, if the user's data usage indicates that the user is approaching an allocated data limit, the mobile device may redirect the streaming media to another network after a short amount of time has elapsed.

The time period may be based on a data type of the streaming media that is being transferred over the data connection on the first network. For example, the time period may be longer if the type of data being transferred is multimedia data such as audio or video. The time period may be shorter if the type of data being transferred is text data. Thus, if the mobile device is presenting a streaming video to the user, the streaming video may be presented to the user for a longer period of time before the streaming video is redirected to another network, which may reduce interruptions to the presentation of the streaming video.

The time period may be based on an input from the user of the mobile device. The mobile device may provide a user interface by which the user may specify the time period for maintaining connections to a network when a channel between the mobile device and another preferred network is available. The user interface may provide the user with various options for specifying the time period. For example, the user interface may allow the user to specify different time periods for different networks. As another example, the user interface may allow the user to specify different time periods for different data types.

After the time period has elapsed, the mobile device may close the data connection on the first communication channel (214). If no other data connections are open on the first communication channel, the mobile device may reduce power provided to a communication interface of the mobile device that maintained the data connection on the first communication channel (216). If the mobile device has not received the entire streaming media, the mobile device may establish another data connection on the second communication channel (218) and may receive a remaining portion of the streaming media through the other data connection on the second communication channel (220). The other data connection on the second communication channel may include a TCP connection.

Figure 3:
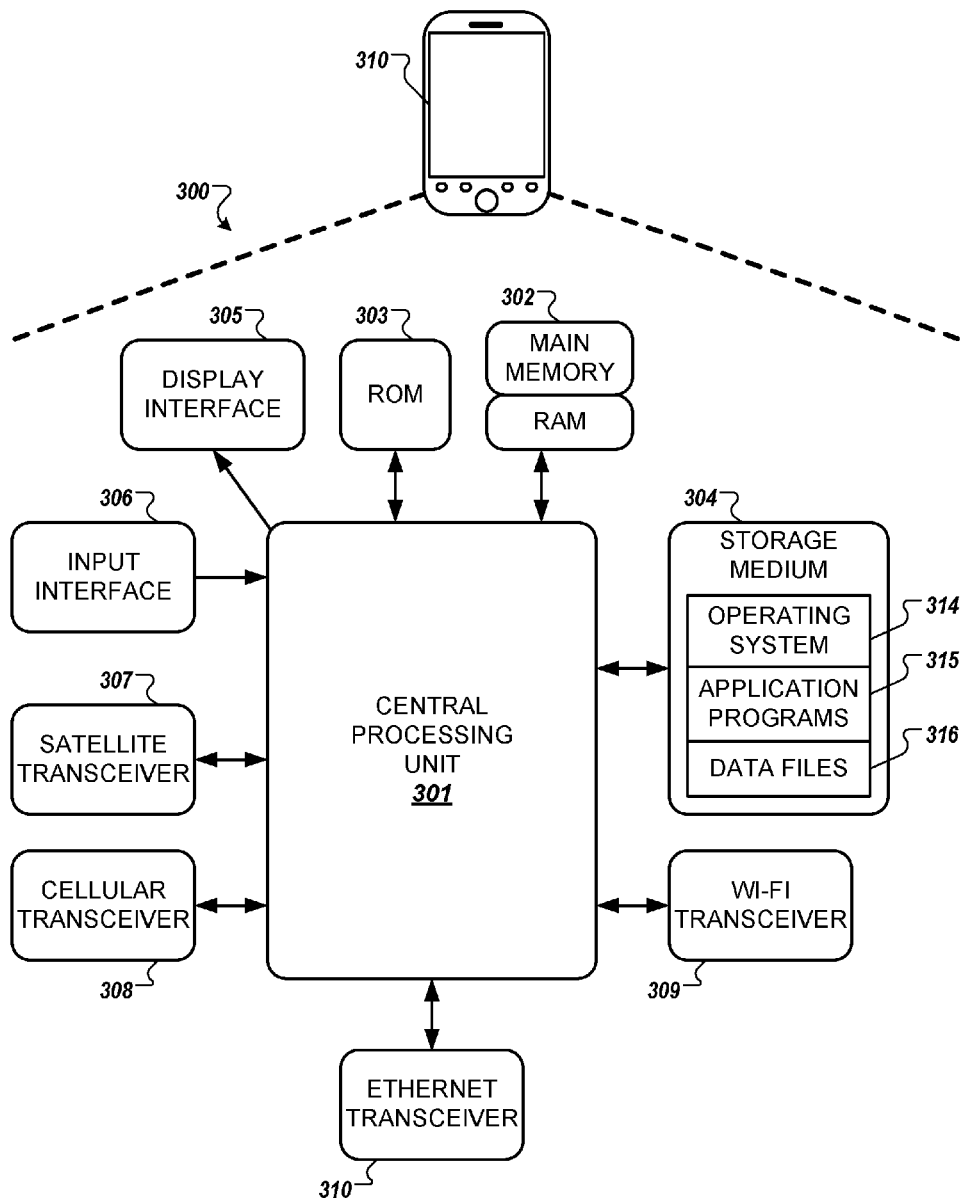
FIG. 3 is a block diagram of an exemplary system for streaming media while switching between different networks.

FIG. 3 is a block diagram showing an exemplary internal architecture 300 of a mobile device 310 for receiving streaming media while switching between different networks. The architecture 300 includes a central processing unit (CPU) 301, a random access memory (RAM) 302, a read-only memory (ROM) 303, a storage medium 304, a display interface 305, and an input interface 306. The CPU 301 processes the computer instructions that include an operating system or an application. The RAM 302 includes a volatile memory device that stores computer instructions and data for processing by the CPU 301. The ROM 303 includes a non-volatile memory device that stores invariant low-level systems code or data for basic system functions such as basic input and output (I/O), startup, or reception of keystrokes from a keyboard. The storage medium 304 or other suitable type of memory (e.g., such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives) stores files that include an operating system 314, application programs 315, and data files 316. The display interface 305 provides a communication interface and processing functions for rendering video, graphics, images, and texts in a user interface. The input interface 306 provides a communication interface to a stylus, keyboard, and/or other input device(s) attached to the mobile device 310.

A computer program product is tangibly embodied in the storage medium 304, a machine-readable storage medium. The computer program product includes instructions that, when read by the central processing unit 301, operate to cause the central processing unit 301 to perform the instructions for receiving streaming media while switching between different networks.

The architecture 300 may include multiple communication interfaces for switching between different networks. Some examples of communication interfaces include a satellite transceiver 307, a cellular transceiver 308, a Wi-Fi transceiver 309, and an Ethernet transceiver 310. The satellite transceiver 307 communicates with a satellite communication network. The cellular transceiver 308 communicates with a cellular communication network. The Wi-Fi transceiver 309 communicates with a wireless local area network. The Ethernet transceiver 310 communicates with a wireline local area network. Each communication interface may detect whether a communication channel is available between the interface and a network transceiver, establish a data connection on the communication channel, and receive data over the data connection.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A method comprising:
   while a mobile device is receiving a media stream through a first data connection on a first communication channel, determining, by the mobile device, that a second communication channel is available;
   determining, by the mobile device, that data of the media stream being received through the first data connection is classified as streaming media; and
   after determining that the second communication channel is available:
   establishing, by the mobile device, a second data connection on the second communication channel;
   after establishing the second data connection, continuing to receive, by the mobile device, the media stream over the first data connection based on determining that the data of the media stream being received through the first data connection is classified as streaming media; and
   receiving, by the mobile device, data that is not part of the media stream through the second data connection while continuing to receive the media stream over the first data connection.

2. The method of claim 1, further comprising:
   after determining that the second communication channel is available and before establishing the second data connection on the second communication channel:
   determining, by the mobile device, whether data that is not part of the media stream has been requested by the mobile device; and
   wherein establishing the second data connection on the second communication channel is performed in response to determining that data that is not part of the media stream has been requested by the mobile device.

3. The method of claim 1, further comprising:
   while the mobile device is receiving the media stream through the first data connection on the first communication channel and before establishing the second data connection on the second communication channel:
   providing, by the mobile device, a representation of the media stream for output at the mobile device.

4. The method of claim 1,
   wherein receiving the media stream through the first data connection on the first communication channel comprises:
   receiving, by the mobile device, data that represents one or more portions of a particular media file or broadcast through the first data connection on the first communication channel; and
   wherein receiving data that is not part of the media stream through the second data connection comprises:
   receiving, by the mobile device, data that is not part of the particular media file or broadcast through the second data connection.

5. The method of claim 1, further comprising:
   after establishing the second data connection on the second communication channel:
   determining, by the mobile device, that the media stream is no longer being received through the first data connection on the first communication channel; and
   in response to determining that the media stream is no longer being received through the first data connection on the first communication channel, closing, by the mobile device, the first data connection on the first communication channel.

6. The method of claim 1,
   wherein receiving the media stream through the first data connection on the first communication channel comprises:
   receiving, by the mobile device, the media stream through the first data connection on a first communication channel between the mobile device and a first network; and
   wherein receiving data that is not part of the media stream through the second data connection on the second communication channel comprises:
   receiving, by the mobile device, data that is not part of the media stream through the second data connection on a second communication channel between the mobile device and a second network that is different from the first network.

7. The method of claim 6, wherein the first communication channel between the mobile device and the first network has a first bandwidth, and the second communication channel between the mobile device and the second network has a second bandwidth that is higher than the first bandwidth.

8. The method of claim 7, wherein the first network is a wireless local area network.

9. The method of claim 7, wherein the second network is a wireless local area network or a wireline local area network.

10. The method of claim 1, wherein the data received through the second data connection that is not part of the media stream is not classified as streaming media.

11. A computer program product, encoded on one or more non-transitory computer storage media, comprising instructions that when executed by one or more computers cause the one or more computers to perform operations comprising:
    while a mobile device is receiving a media stream through a first data connection on a first communication channel, determining, by the mobile device, that a second communication channel is available;
    determining, by the mobile device, that data of the media stream being received through the first data connection is classified as streaming media; and
    after determining that the second communication channel is available:
    establishing, by the mobile device, a second data connection on the second communication channel;
    after establishing the second data connection, continuing to receive, by the mobile device, the media stream over the first data connection based on determining that the data of the media stream being received through the first data connection is classified as streaming media; and
receiving, by the mobile device, data that is not part of the media stream through the second data connection while continuing to receive the media stream over the first data connection.

12. The computer program product of claim 11, wherein the operations further comprise:
after determining that the second communication channel is available and before establishing the second data connection on the second communication channel:
determining, by the mobile device, whether data that is not part of the media stream has been requested by the mobile device; and
wherein establishing the second data connection on the second communication channel is performed in response to determining that data that is not part of the media stream has been requested by the mobile device.

13. The computer program product of claim 11, wherein the operations further comprise:
while the mobile device is receiving the media stream through the first data connection on the first communication channel and before establishing the second data connection on the second communication channel:
providing, by the mobile device, a representation of the media stream for output at the mobile device.

14. The computer program product of claim 11,
wherein receiving the media stream through the first data connection on the first communication channel comprises:
receiving, by the mobile device, data that represents one or more portions of a particular media file or broadcast through the first data connection on the first communication channel; and
wherein receiving data that is not part of the media stream through the second data connection comprises:
receiving, by the mobile device, data that is not part of the particular media file or broadcast through the second data connection.

15. The computer program product of claim 11, wherein the operations further comprise:
after establishing the second data connection on the second communication channel:
determining, by the mobile device, that the media stream is no longer being received through the first data connection on the first communication channel; and
in response to determining that the media stream is no longer being received through the first data connection on the first communication channel, closing, by the mobile device, the first data connection on the first communication channel.

16. A system comprising:
one or more computers and one or more storage devices storing instructions that are operable, when executed by the one or more computers, to cause the one or more computers to perform operations comprising:
while a mobile device is receiving a media stream through a first data connection on a first communication channel, determining, by the mobile device, that a second communication channel is available;
determining, by the mobile device, that data of the media stream being received through the first data connection is classified as streaming media; and
after determining that the second communication channel is available:
establishing, by the mobile device, a second data connection on the second communication channel;
after establishing the second data connection, continuing to receive, by the mobile device, the media stream over the first data connection based on determining that the data of the media stream being received through the first data connection is classified as streaming media; and
receiving, by the mobile device, data that is not part of the media stream through the second data connection while continuing to receive the media stream over the first data connection.

17. The system of claim 16, wherein the operations further comprise:
after determining that the second communication channel is available and before establishing the second data connection on the second communication channel:
determining, by the mobile device, whether data that is not part of the media stream has been requested by the mobile device; and
wherein establishing the second data connection on the second communication channel is performed in response to determining that data that is not part of the media stream has been requested by the mobile device.

18. The system of claim 16, wherein the operations further comprise:
while the mobile device is receiving the media stream through the first data connection on the first communication channel and before establishing the second data connection on the second communication channel:
providing, by the mobile device, a representation of the media stream for output at the mobile device.

19. The system of claim 16,
wherein receiving the media stream through the first data connection on the first communication channel comprises:
receiving, by the mobile device, data that represents one or more portions of a particular media file or broadcast through the first data connection on the first communication channel; and
wherein receiving data that is not part of the media stream through the second data connection comprises:
receiving, by the mobile device, data that is not part of the particular media file or broadcast through the second data connection.

20. The system of claim 16, wherein the operations further comprise:
after establishing the second data connection on the second communication channel:
determining, by the mobile device, that the media stream is no longer being received through the first data connection on the first communication channel; and
in response to determining that the media stream is no longer being received through the first data connection on the first communication channel, closing, by the mobile device, the first data connection on the first communication channel.

* * * * *